United States Patent
Lee et al.

(10) Patent No.: US 6,637,458 B1
(45) Date of Patent: Oct. 28, 2003

(54) FLOATING PLUG VALVE APPARATUS FOR STORING AND DISPENSING HIGH PURITY LIQUID

(75) Inventors: Wei-Cheng Lee, Panchiao (TW); Biing-Huang Yang, Hsin Chu (TW); Long-Chun Tsai, Hsin-Chu (TW); Ming-Tzung Hsu, Hsinchu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 09/553,302

(22) Filed: Apr. 20, 2000

(51) Int. Cl.[7] ............................................. F16K 24/00
(52) U.S. Cl. ..................................... 137/587; 137/493.9
(58) Field of Search ................................ 137/587, 493.9

(56) References Cited

U.S. PATENT DOCUMENTS

| | | | |
|---|---|---|---|
| 1,856,492 A | * 5/1932 | Marshall | 137/493.9 |
| 3,527,379 A | * 9/1970 | Mair | 137/587 |
| 3,814,123 A | * 6/1974 | Cook | 137/493.9 |
| 5,058,621 A | * 10/1991 | Thumm | 137/340 |
| 5,165,445 A | * 11/1992 | Vertanen | 137/493.6 |
| 5,167,808 A | 12/1992 | Carr et al. | |
| 5,311,904 A | 5/1994 | Beppu | |
| 5,476,118 A | 12/1995 | Yokoyama | |

* cited by examiner

*Primary Examiner*—A. Michael Chambers
(74) *Attorney, Agent, or Firm*—tung & associates

(57) ABSTRACT

Within an apparatus for storing a liquid, there is first included a storage tank. The storage tank has formed integral thereto and in fluid communication therewith a liquid inlet port and a liquid outlet port. The storage tank also has formed integral thereto and in fluid communication therewith a gas inlet port and a gas outlet port. Finally, the gas outlet port has connected thereto and in fluid communication therewith a floating plug valve. The floating plug valve comprises a first plug movably positioned over and sealing a first aperture within the floating plug valve such that a first weight of the first plug and a first area of the first aperture define an upper operating pressure of a gas introduced into the storage tank through the gas inlet port. The apparatus of the present invention also contemplates a floating plug valve employed within the apparatus of the present invention.

15 Claims, 1 Drawing Sheet

FLOATING PLUG VALVE APPARATUS FOR STORING AND DISPENSING HIGH PURITY LIQUID

BACKGROUND OF THE INVENTION

1. Field of the Invention

The present invention relates generally to apparatus employed for providing high purity liquids. More particularly, the present invention relates to apparatus employed for storing and dispensing high purity liquids when providing high purity liquids.

2. Description of the Related Art

Microelectronic fabrications are formed from microelectronic substrates over which are formed patterned microelectronic conductor layers which are separated by microelectronic dielectric layers.

Common in the art of microelectronic fabrication is the use of high purity liquids, such as but not limited to high purity deionized water, high purity aqueous acids, high purity aqueous bases and high purity organic solvents, to effect fabrication of microelectronic fabrications. Within the art of microelectronic fabrication, such high purity liquids are typically characterized by dissolved and/or suspended detrimental impurity levels of less than about 100 parts per billion, and more typically and preferably such high purity liquids are characterized by dissolved and/or suspended detrimental impurity levels of less than about 100 parts per trillion.

High purity liquids are typically desirable, and often essential, within the art of microelectronic fabrication for fabricating microelectronic fabrications, since such high purity liquids typically provide microelectronic fabrication processes which provide minimal detrimental residues formed upon microelectronic fabrications which are fabricated employing the microelectronic fabrication processes which employ the high purity liquids. Within the art of microelectronic fabrication, such detrimental residues otherwise generally contribute to compromised microelectronic fabrication yield and/or compromised microelectronic fabrication reliability when fabricating microelectronic fabrications.

While high purity liquids are thus desirable and often essential within the art of microelectronic fabrication in order to ultimately provide microelectronic fabrications with enhanced yield and enhanced reliability, high purity liquids are nonetheless typically not provided entirely without difficulties within the art of microelectronic fabrication. In that regard, it is known in the art of microelectronic fabrication that high purity liquids are often difficult to both: (1) form with a high purity level; and (2) subsequently maintain at the high purity level, since in particular exposure of a high purity liquid to an ambient environment, a contaminating processing apparatus or a contaminating distribution apparatus will often provide for an accelerated deterioration of the purity level of the high purity liquid when employed for fabricating a microelectronic fabrication.

It is thus towards the goal of providing for use within the art of microelectronic fabrication an apparatus which assists in providing for enhanced purity integrity of high purity liquids that the present invention is directed.

Various apparatus have been disclosed in the art of microelectronic fabrication for providing an enhanced purity integrity of high purity liquids which are employed in the art of microelectronic fabrication or maintaining the enhanced purity integrity of high purity liquids which are employed in the art of microelectronic fabrication.

For example, Carr et al., in U.S. Pat. No. 5,167,808, discloses a deionized water purification system which may be continuously operated and employed for providing high purity deionized water which in turn may be employed for fabricating a microelectronic fabrication. In order to realize the foregoing object, the deionized water purification system employs, among other components: (1) a pair of sub-micrometer pre-filters, positioned in parallel, such that one of the sub-micrometer pre-filters may be changed while the other of the sub-micrometer pre-filters is employed for continuously filtering a source of deionized water to form a source of sub-micrometer pre-filtered deionized water which is employed in forming the high purity deionized water, in conjunction with; (2) a continuous purge of an upstream flow of the source of sub-micrometer pre-filtered deionized water from an ultrafilter which is downstream from the pair of sub-micron pre-filters, such as to minimize contaminant buildup upon the ultrafilter and related downstream piping.

In addition, Beppu, in U.S. Pat. No. 5,311,904, discloses a valve which may be employed within a high purity liquid piping system which in turn may be employed in providing a high purity liquid employed in fabricating a microelectronic fabrication, where the valve when connected to a branch pipe within the high purity liquid piping system which is in turn connected to a main pipe within the high purity liquid piping system prevents stagnation of a high purity liquid within the branch pipe within the high purity liquid piping system under circumstances where the valve employed within the high purity liquid piping system is closed. In order to effect the foregoing result, the valve incorporates inserted into an end of the branch pipe upon which is connected the valve and extending into the main pipe to which the branch pipe is connected a diverter member which continuously diverts a flow of the high purity liquid into and out of the branch pipe, even when the valve employed within the high purity liquid piping system is closed.

Finally, Yokoyama, in U.S. Pat. No. 5,476,118, similarly discloses a high purity liquid piping system which may be employed in providing a high purity liquid which may be employed in fabricating a microelectronic fabrication, wherein the high purity liquid piping system prevents stagnation of the high purity liquid within the high purity liquid piping system regardless of whether a valve which is connected to the high purity liquid piping system is open or closed. In order to effect the foregoing result, the high purity liquid piping system employs at an upstream side of the valve which is connected to a main pipe within the high purity liquid piping system a proximal end of a bypass pipe thus interposed between the valve and the main pipe, where a distal end of the bypass pipe reconnects with the main pipe at a downstream location of the main pipe, at which downstream location there is incorporated into the main pipe a flow restricter, such that a flow of the high purity liquid through the bypass pipe is facilitated.

Desirable in the art of microelectronic fabrication are additional apparatus which assist in providing for enhanced purity integrity of high purity liquids which may be employed in fabricating microelectronic fabrications.

It is towards the foregoing object that the present invention is directed.

SUMMARY OF THE INVENTION

A first object of the present invention is to provide an apparatus for providing a high purity liquid for use when fabricating a microelectronic fabrication.

A second object of the present invention is to provide an apparatus in accord with the first object of the invention, wherein the apparatus provides for enhanced purity integrity of the high purity liquid.

A third object of the present invention is to provide an apparatus in accord with the first object of the present invention and the second object of the present invention, which apparatus is readily commercially fabricated.

In accord with the objects of the present invention, there is provided by the present invention an apparatus for storage of a liquid. The apparatus comprises a storage tank, where the storage tank has formed integral thereto and in fluid communication therewith both a liquid inlet port and a liquid outlet port. The storage tank also has formed integral thereto and in fluid communication therewith both a gas inlet port and a gas outlet port. Finally, the gas outlet port has connected thereto and in fluid communication therewith a floating plug valve.

Within the present invention, the floating plug valve comprises a first plug movably positioned over and sealing a first aperture within the floating plug valve such that a first weight of the first plug and a first area of the first aperture define an upper operating pressure of a gas introduced into the storage tank through the gas inflow port.

The present invention also contemplates a floating plug valve which may be employed within the apparatus of the present invention.

The present invention provides an apparatus for providing a high purity liquid for use when fabricating a microelectronic fabrication, wherein the apparatus provides for enhanced purity integrity of the high purity liquid. The present invention realizes the foregoing objects by employing in conjunction with a storage tank for storage and dispensing of a high purity liquid which may be employed when fabricating a microelectronic fabrication a floating plug valve connected to and in fluid communication with a gas outlet port similarly integral to and in fluid communication with the storage tank, where the floating plug valve comprises a first plug movably positioned over and sealing a first aperture within the floating plug valve such that a first weight of the first plug and a first area of the first aperture define an upper operating pressure of a gas introduced into the storage tank through a gas inlet port which is also integral to and in fluid communication with the storage tank.

The apparatus of the present invention is readily commercially fabricated. As will become clear within the context of the Description of the Preferred Embodiment which follows, an apparatus in accord with the present invention may be readily fabricated employing components and materials which are readily available within, or readily adapted to, at least the art of microelectronic fabrication. Thus, the apparatus of the present invention is readily commercially fabricated.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides an apparatus for providing a high purity liquid for use when fabricating a microelectronic fabrication, wherein the apparatus provides for enhanced purity integrity of the high purity liquid. The present invention realizes the foregoing objects by employing in conjunction with a storage tank for storage and dispensing of a high purity liquid which may be employed when fabricating a microelectronic fabrication a floating plug valve connected to and in fluid communication with a gas outlet port which is similarly integral to and in fluid communication with the storage tank, wherein the floating plug valve comprises a first plug movably positioned over and sealing a first aperture within the floating plug valve such that a first weight of the first plug and a first area of the first aperture define an upper operating pressure of a gas introduced into the storage tank through a gas inlet port which is also integral to and in fluid communication with the storage tank.

Although the preferred embodiment of the present invention illustrates the present invention within the context of providing an apparatus for storing and dispensing a high purity liquid, such as in particular high purity deionized water employed in fabricating a microelectronic fabrication, the apparatus of the present invention may also be employed within industrial applications including but not limited to microelectronic fabrication applications, medical device fabrication applications, pharmaceutical fabrication applications, chemical fabrication applications and biological fabrication applications. Similarly, within the context of microelectronic fabrication applications, although the apparatus of the present invention is most likely to be employed for storing and dispensing high purity deionized water employed for fabricating microelectronic fabrications within the art of microelectronic fabrication, the apparatus of the present invention may also be employed in storing and dispensing high purity liquids including but not limited to high purity deionized water, high purity aqueous acids, high purity aqueous bases and high purity organic solvents within any of the foregoing applications which include but are not limited to microelectronic fabrication applications.

Figure 1:
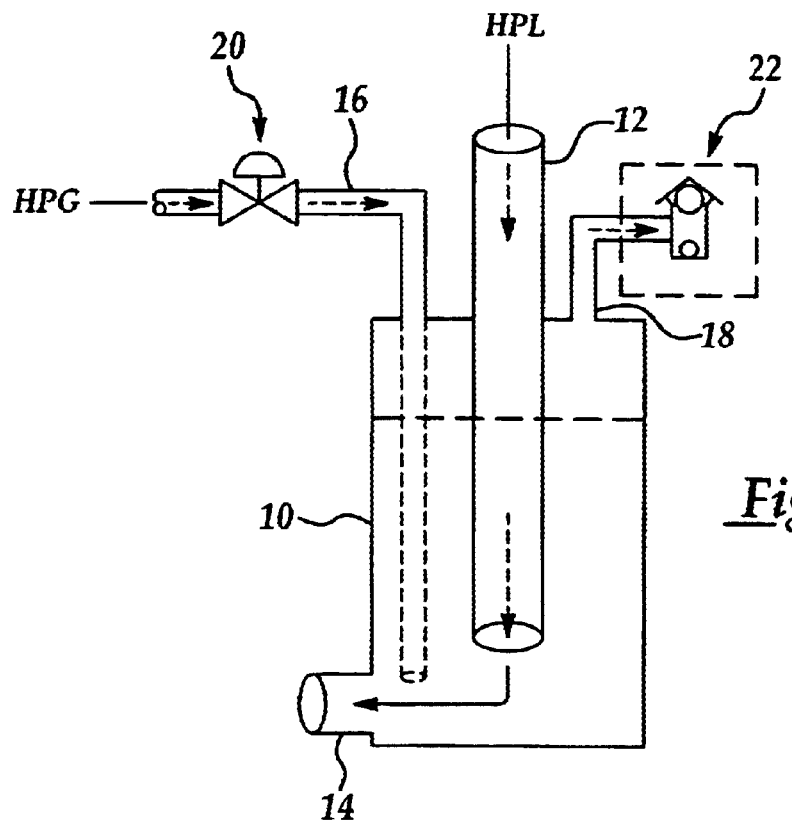
FIG. 1 shows a schematic diagram of an apparatus fabricated in accord with the present invention.

Referring not to FIG. 1, there is shown a schematic diagram illustrating an apparatus in accord with the preferred embodiment of the present invention, wherein the apparatus may be employed for storing and dispensing a high purity liquid, preferably high purity deionized water, as employed within the art of microelectronic fabrication for fabricating a microelectronic fabrication.

Shown in FIG. 1 is a storage tank 10 having formed integral thereto and in fluid communication therewith both a liquid inlet port 12 and a liquid outlet port 14. Similarly, there is also shown within FIG. 1 also formed integral to the storage tank 10 and in fluid communication therewith a gas inlet port 16 and a gas outlet port 18. In addition, there is also shown within the schematic diagram of FIG. 1 connected to and in fluid communication with the gas inlet port 16 a gas inlet valve 20. Finally, there is also shown within the schematic diagram of FIG. 1 connected to and in fluid communication with the gas outlet port 18 a floating plug valve 22.

Within the preferred embodiment of the apparatus of the present invention as illustrated within FIG. 1, each of the foregoing components is typically and preferably fabricated employing materials which are inert and non contaminating with respect to: (1) a high purity liquid HPL which is introduced into the storage tank 10 through the liquid inlet port 12 and dispensed from the storage tank 10 through the liquid outlet port 14; and (2) a high purity gas HPG which is introduced into the storage tank 10 through the gas inlet port 16 and exhausted from the storage tank 10 through the gas outlet port 18.

As noted above, the high purity liquid HPL may be selected from the group of liquids including but not limited to high purity deionized water, high purity aqueous acids, high purity aqueous bases and high purity organic solvents. Similarly, typically but not exclusively, the high purity gas HPG may be selected from the group of high purity gases including but not limited to high purity nitrogen, high purity argon and high purity helium, typically and preferably having a detrimental impurity concentration of less than about 100 parts per billion. Most commonly, within the context of a microelectronic fabrication application, the high purity liquid HPL is high purity deionized water and the high purity gas HPG is high purity nitrogen.

Although the components within the preferred embodiment of the apparatus of the present invention as illustrated within the schematic diagram of FIG. 1 may be sized appropriately for a particular flow of a high purity liquid HPL desired within a particular application, for the preferred embodiment of the apparatus of the present invention as employed within the art of microelectronic fabrication where the high purity liquid HPL is high purity deionized water and the high purity gas HPG is high purity nitrogen, the storage tank 10 will typically and preferably be sized to accommodate a volume of from about 50 to about 5,000 gallons of high purity deionized water and will typically and preferably be operated within a range of from about 70 to about 90 percent of the volume to which the storage tank 10 is sized.

Finally, as is illustrated within the schematic diagram of FIG. 1, the gas inlet port 16 may have formed integral thereto and in fluid communication therewith an extension (as is illustrated by the phantom broken lines) which penetrates into the storage tank 10, analogously with the liquid inlet port 12. In the absence of such an extension penetrating into the storage tank 10, the high purity gas HPG serves primarily a blanketing function over the high purity liquid HPL within the storage tank 10. Similarly, with the presence of such an extension penetrating into the storage tank 10, the high purity gas HPG serves both a blanketing function and a purging function with respect to the high purity liquid HPL within the storage tank 10.

Within normal operation of the preferred embodiment of the apparatus of the present invention whose schematic diagram is illustrated within FIG. 1, quantities of the high purity liquid HPL introduced into the storage tank 10 through the liquid inlet port 12 and quantities of the high purity liquid HPL dispensed from the storage tank 10 through the liquid outlet port 14 are not generally equivalent over a relatively short (i.e., up to 30 minute) timescale, and thus there is typically, as suggested above, a variation of the level of the high purity liquid HPL within the storage tank 10.

Within the present invention and the preferred embodiment of the present invention, it is at least in part the floating plug valve 22 which provides value of the present invention in economically providing for enhanced purity integrity of the high purity liquid HPL within the storage tank 10. A schematic diagram illustrating further enlarged details of the floating plug valve 22 is shown within the schematic diagram of FIG. 2.

Figure 2:
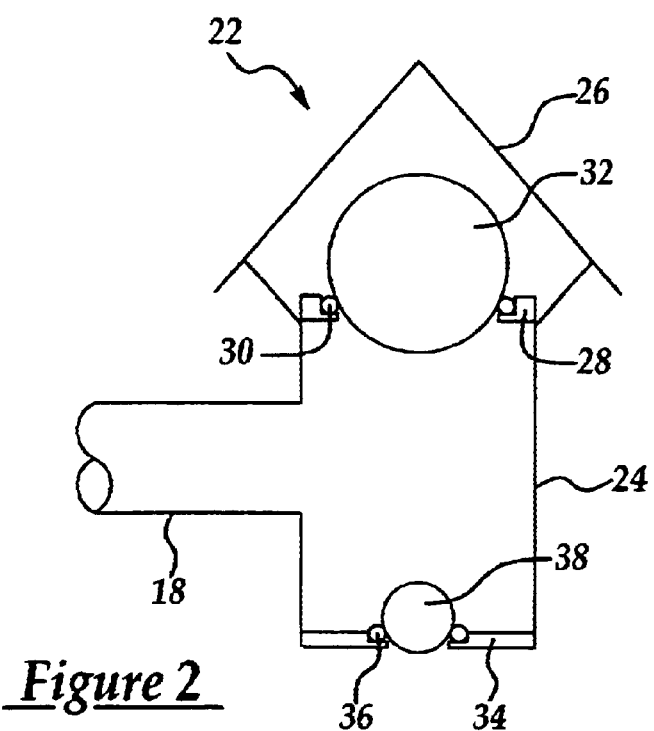
FIG. 2 shows a schematic diagram of a floating plug valve as employed within the apparatus fabricated in accord with the present invention as illustrated within the schematic diagram of FIG. 1.

Shown in FIG. 2 is the floating plug valve 22 which as illustrated within the schematic diagram of FIG. 1 is connected to and in fluid communication with the gas outlet port 18 of the storage tank 10.

As is illustrated within the schematic diagram of FIG. 2, the floating plug valve 22 in a first instance comprises a housing 24 having attached thereto a ventilated cap 26. Similarly, the housing 24 also has formed integral thereto an upper plate 28 which although not completely illustrated within the schematic diagram of FIG. 2 has formed therein a first lip which defines a first aperture within the upper plate 28. Similarly, within the first lip there is positioned a first sealing gasket 30. Finally, the first sealing gasket 30 in turn has positioned thereupon a first sealing plug 32.

Similarly, as is also illustrated within the schematic diagram of FIG. 2, the floating plug valve 22 in a second instance also comprises formed integral to the housing 24 a lower plate 34 which although not completely illustrated within the schematic diagram of FIG. 2 has formed therein a second lip which defines a second aperture within the lower plate 34. Analogously, within the second lip there is positioned a second sealing gasket 36. Finally, the second sealing gasket 36 in turn has positioned thereupon a second sealing plug 38.

As is illustrated within the schematic diagram of FIG. 2: (1) the first sealing plug 32 is retained from completely penetrating into the housing 24 when sealing the first aperture within the upper plate 28; and (2) the second sealing plug 38 is retained from completely penetrating out of the housing 24 when sealing the second aperture within the lower plate 34. Similarly, although the preferred embodiment of the floating plug valve 22 of the present invention illustrates the upper plate 28 disposed over the lower plate 34, such is not necessarily required within a floating plug valve in accord with the present invention and such may be avoided incident to alternative geometric configurations of a housing employed within a floating plug valve in accord with the present invention.

Within the present invention and the preferred embodiment of the present invention, the floating plug valve 22 preferably has no additional apertures through which a gas may flow other than: (1) the gas outlet port 18 (which serves as a gas inlet port with respect to the floating plug valve 22); (2) the first aperture; and (3) the second aperture. Thus, in a typical and preferred operation of the floating plug valve 22 of the preferred embodiment of the present invention: (1) a first gas, such as the high purity gas HPG as illustrated within the schematic diagram of FIG. 1, may simultaneously flow out of the gas outlet port 18 and out of the first aperture; or (2) a second gas, such as an atmospheric gas, may simultaneously flow into the second aperture and into the gas outlet port 18; but (3) the first gas and the second gas may not flow simultaneously with respect to the housing 24.

Although within the preferred embodiment of the present invention: (1) both the first sealing plug 32 and the second sealing plug 38 are illustrated as nominally circular in two dimensions and thus both the first sealing plug 32 and the second sealing plug 38 are presumably and preferably nominally spherical in three dimensions, which in turn implies that; (2) for proper sealing of the first sealing plug 32 with the first sealing gasket 30 and proper sealing of the second sealing plug 38 with the second sealing gasket 36 each of the first aperture defined by the lip within the upper plate 28 and the second aperture defined by the lip within the lower plate 34 are presumably and preferably circular apertures, within the present invention in general, neither the first sealing plug 32 nor the second sealing plug 38 need necessarily be a spherical sealing plug nor need necessarily the corresponding first aperture nor the corresponding second aperture be a circular aperture. What is required within the present invention, however, is that the geometry of the first sealing plug 32 and the geometry of the second sealing plug 38 independently correspond with the geometry of the first aperture and the geometry of the second aperture such that the first sealing plug 32 maintains an effective seal with the first sealing gasket 30 and the second sealing plug 38 maintains an effective seal with the second sealing gasket 36.

Within the preferred embodiment of the present invention: (1) the first sealing plug 32 is formed of dimensions and material density; and (2) the first aperture formed of appropriate areal dimensions, such that there is defined an upper operating pressure of the high purity gas HPG above the high purity liquid HPL (if present) within the storage tank 10. Within the preferred embodiment of the present invention under circumstances where the storage tank 10 has, as noted above, a volume of from about 50 to about 5,000 gallons with a desired high purity gas HPG volume within the storage tank 10 incident to routine operation of the apparatus whose schematic diagram is illustrated within FIG. 1 of from about 70 to about 90 percent of the volume of the storage tank 10, the first sealing plug 32 will typically and preferably have a weight of from about 0.1 to about 10 pounds and the first aperture will typically and preferably have an areal dimension of from about 0.2 to about 20 square inches.

Within the preferred embodiment of the present invention: (1) the second sealing plug 38 is formed of dimensions and material density; and (2) the second aperture formed of appropriate areal dimensions, such that there is defined a lower operating pressure of the high purity gas HPG above the high purity liquid HPL (if present) within the storage tank 10. Within the preferred embodiment of the present invention under circumstances where the storage tank 10 has a volume of from about 50 to about 5,000 gallons with a desired high purity gas HPG volume within the storage tank 10 incident to routine operation of the apparatus whose schematic diagram is illustrated within FIG. 1 of from about 70 to about 90 percent of the volume of the storage tank 10, the second sealing plug 38 will typically and preferably have a weight of from about 0.1 to about 10 pounds and the second aperture will typically and preferably have an areal dimension of from about 0.2 to about 20 square inches.

Within the preferred embodiment of the present invention, and similarly with the other components within the apparatus whose schematic diagram is illustrated in FIG. 1, all of the components with the floating plug valve 22 whose schematic diagram is illustrated in FIG. 2 are typically and preferably formed of materials as are inert and non-contaminating with respect to both the high purity liquid HPL and the high purity gas HPG as illustrated within the schematic diagram of FIG. 1. Typically and preferably, each of the first sealing plug 32 and the second sealing plug 38, as well as the corresponding first sealing gasket 30 and the corresponding second sealing gasket 36 will have formed upon at least their outer surfaces materials, such as but not limited to fluoropolymer materials, which simultaneously possess superior sealing properties and superior chemical inertness properties.

As is understood by a person skilled in the art, the apparatus of the present invention as illustrated within the schematic diagram of FIG. 1 and the floating plug valve 22 as illustrated within the schematic diagram of FIG. 2, provide significant value insofar as the floating plug valve 22 allows for an independent adjustment of an upper operating pressure and a lower operating pressure of a high purity gas HPG above a high purity liquid HPL (if present) within the apparatus of the present invention whose schematic diagram is illustrated in FIG. 1. Similarly, as is also understood by a person skilled in the art, such an independent adjustment of an upper operating pressure and a lower operating pressure of the high purity gas HPG above the high purity liquid HPL (if present) within the apparatus whose schematic cross-sectional diagram is illustrated in FIG. 1 provides that there may be employed a wide variation of the upper operating pressure and the lower operating pressure and thus consequently there may be substantially limited an amount of the high purity gas HPG that is employed when blanketing the high purity liquid HPL within the apparatus whose schematic diagram is illustrated in FIG. 1.

In addition, since the apparatus of the present invention and the floating plug valve 22 employed within the apparatus of the present invention do not employ a liquid for purposes of sealing the high purity gas HPG over the high purity liquid HPL, there is avoided within the apparatus of the present invention through use of the floating plug valve 22 of the present invention any back streaming or back suction of such a sealing liquid which would otherwise compromise purity of the high purity liquid HPL within the storage tank 10 within the apparatus of the present invention as illustrated within the schematic diagram of FIG. 1.

Finally, as is also understood by a person skilled in the art, the preferred embodiment of the present invention is illustrative of the present invention rather than limiting of the present invention. Revisions and modifications may be made to materials, structures and dimensions through which is provided an apparatus in accord with the preferred embodiment of the invention or a floating plug valve in accord with the preferred embodiment of the present invention while still providing an apparatus or a floating plug valve in accord with the present invention, further in accord with the appended claims.

What is claimed is:

1. An apparatus for storage of a liquid comprising:
   a storage tank, the storage tank having formed integral thereto and in fluid communication therewith a liquid inlet port and a liquid outlet port;
   a gas inlet port also formed integral to and in fluid communication with the storage tank;
   a gas outlet port also formed integral to and in fluid communication with the storage tank; and
   a floating plug valve connected to and in fluid communication with the gas outlet port, wherein the floating plug valve comprises a first plug movably positioned over and sealing a first aperture within the floating plug valve such that a first weight of the first plug and a first area of the first aperture define an upper operating pressure of a gas introduced into the storage tank through the gas inlet port and exiting through the floating plug valve.

2. The apparatus of claim 1 wherein:
   the storage tank has a volume of from about 50 to about 5,000 gallons; and
   the storage tank has an operating range of a liquid within the storage tank of from about 70 to about 90 percent of the volume of the storage tank.

3. The apparatus of claim 1 wherein:

the first weight is from about 0.1 to about 10 pounds; and the first area is from about 0.2 to about 20 square inches.

4. The apparatus of claim 1 wherein the floating plug valve further comprises a second plug movably positioned over and sealing a second aperture within the floating plug valve such that a second weight of the second plug and a second area of the second aperture define a lower operating pressure of the gas introduced into the storage tank through the gas inlet port.

5. The apparatus of claim 4 wherein:

the second weight is from about 0.1 to about 10 pounds; and the second area is from about 0.2 to about 20 square inches.

6. The apparatus of claim 4 wherein:

the first aperture is defined by a upper plate connected to a housing which also comprises the floating plug valve and the second aperture is defined by a lower plate connected to the housing which also comprises the floating plug valve;

the first plug is retained from completely penetrating into the housing when sealing the first aperture; and the second plug is retained from completely penetrating out of the housing when sealing the second aperture.

7. The apparatus of claim 6 wherein the floating plug valve comprises no additional apertures through which a gas may flow other than the gas inlet, the first aperture and the second aperture.

8. The apparatus of claim 1 wherein the liquid is a high purity liquid selected from the group consisting of high purity deionized water, high purity aqueous acids, high purity aqueous bases and high purity organic solvents.

9. The apparatus of claim 8 wherein the high purity liquid is employed in fabricating a product selected from the group consisting of microelectronic products, medical products, pharmaceutical products, chemical products and biological products.

10. An apparatus for storage of a liquid comprising:

a storage tank, the storage tank having formed integral thereto and in fluid communication therewith a liquid inlet port and a liquid outlet port;

a gas inlet port also formed integral to and in fluid communication with the storage tank;

a gas outlet port also formed integral to and in fluid communication with the storage tank, the gas outlet port being separate from the gas inlet port; and a floating plug valve connected to and in fluid communication with the gas outlet port.

11. The apparatus of claim 10 wherein the floating plug valve comprises a first plug movably positioned over and sealing a first aperture within the floating plug valve such that a first weight of the first plug and a first area of the first aperture define an upper operating pressure of a gas introduced into the storage tank through the gas inlet port.

12. The apparatus of claim 10 wherein the floating plug valve further comprises a second plug movably positioned over and sealing a second aperture within the floating plug valve such that a second weight of the second plug and a second area of the second aperture define a lower operating pressure of the gas introduced into the storage tank through the gas inlet port.

13. An apparatus for storage of a liquid comprising:

a storage tank, the storage tank having formed integral thereto and in fluid communication therewith a liquid inlet port and a liquid outlet port;

a gas inlet port also formed integral to and in fluid communication with the storage tank;

a gas source connected to the gas inlet port;

a gas outlet port also formed integral to and in fluid communication with the storage tank, the gas outlet port being separate from the gas inlet port; and a floating plug valve connected to and in fluid communication with the gas outlet port.

14. The apparatus of claim 13 wherein the floating plug valve comprises a first plug movably positioned over and sealing a first aperture within the floating plug valve such that a first weight of the first plug and a first area of the first aperture define an upper operating pressure of a gas introduced into the storage tank through the gas inlet port.

15. The apparatus of claim 14 wherein the floating plug valve further comprises a second plug movably positioned over and sealing a second aperture within the floating plug valve such that a second weight of the second plug and a second area of the second aperture define a lower operating pressure of the gas introduced into the storage tank through the gas inlet port.

* * * * *